(12) United States Patent
Edwards et al.

(10) Patent No.: US 6,214,467 B1
(45) Date of Patent: Apr. 10, 2001

(54) POLYMER-PIGMENT COMPOSITES

(75) Inventors: Steven Scott Edwards, Horsham; John Michael Friel, Warminster; Bernhard Helmut Lieser; Alvin Michael Maurice, both of Lansdale; Edwin Hugh Nungesser, Horsham; Robert David Solomon, Souderton, all of PA (US)

(73) Assignee: Rohm and Haas Company, Phila, PA (US)

( * ) Notice: Subject to any disclaimer, the term of this patent is extended or adjusted under 35 U.S.C. 154(b) by 0 days.

(21) Appl. No.: 09/357,181

(22) Filed: Jul. 20, 1999

Related U.S. Application Data

(60) Provisional application No. 60/093,995, filed on Jul. 24, 1998.

(51) Int. Cl.$^7$ .......................... B32B 27/20; B32B 27/30; C08K 3/22; C08K 9/12
(52) U.S. Cl. .......................... 428/407; 523/205; 523/334; 524/497; 524/847; 427/385.5
(58) Field of Search .................................. 524/431, 497, 524/847; 523/267, 205, 334; 428/407; 427/385.5

(56) References Cited

U.S. PATENT DOCUMENTS

| | | |
|---|---|---|
| Re. 34,145 | 12/1992 | Martin . |
| 3,532,662 | 10/1970 | Ansdell . |
| 4,025,483 | 5/1977 | Ramig, Jr. . |
| 4,110,285 | 8/1978 | Pons et al. . |
| 4,421,660 | 12/1983 | Solc nee Hajna . |
| 4,506,057 | 3/1985 | Greene et al. . |
| 4,798,854 | 1/1989 | Visca et al. . |
| 4,846,893 | 7/1989 | Akasaki et al. . |
| 5,204,388 | 4/1993 | Tonge et al. . |
| 5,231,131 | 7/1993 | Chu et al. . |
| 5,264,530 | 11/1993 | Darmon et al. . |
| 5,268,197 | 12/1993 | Pons et al. . |
| 5,385,960 | 1/1995 | Emmons et al. . |
| 5,412,019 | 5/1995 | Roulstone et al. . |
| 5,509,960 | 4/1996 | Simpson et al. . |
| 5,530,070 | 6/1996 | Antonelli et al. . |
| 5,534,585 | 7/1996 | Roulstone et al. . |
| 5,554,215 | 9/1996 | Simpson et al. . |
| 5,663,224 | 9/1997 | Emmons et al. . |
| 5,672,201 | 9/1997 | Simpson et al. . |
| 5,708,095 | 1/1998 | Page et al. . |
| 5,710,227 | * 1/1998 | Freeman et al. ............. 526/208 |
| 5,770,648 | 6/1998 | Antonelli et al. . |
| 5,869,559 | * 2/1999 | Simpson et al. ............. 524/497 |

FOREIGN PATENT DOCUMENTS

| | | |
|---|---|---|
| 0625541 A2 | 11/1994 | (EP) . |
| 0615528 B1 | 4/1997 | (EP) . |
| 0615534 B1 | 4/1997 | (EP) . |
| 0615535 B1 | 5/1998 | (EP) . |
| 0700976 B1 | 12/1998 | (EP) . |
| 62181302 | 8/1987 | (JP) . |
| WO 85/02857 | 7/1985 | (WO) . |
| WO 93/11181 | 6/1993 | (WO) . |
| WO 97/04032 | 2/1997 | (WO) . |

* cited by examiner

*Primary Examiner*—Tae Yoon
(74) *Attorney, Agent, or Firm*—Wendy A. Choi

(57) ABSTRACT

Polymer-pigment composites, aqueous dispersions of polymer-pigment composites and coating compositions containing the polymer-pigment composites are disclosed, wherein the polymer is formed from terminally-unsaturated oligomers containing acid functionality.

10 Claims, No Drawings

POLYMER-PIGMENT COMPOSITES

CROSS REFERENCE TO RELATED APPLICATIONS

This application is a continuation-in-part of U.S. Application Ser. No. 60/093,995 filed Jul. 24, 1998.

This invention relates to polymer-pigment composites, aqueous dispersions of polymer-pigment composites and paints containing the polymer-pigment composites. More particularly, this invention relates to polymer-pigment composites wherein the polymer is formed from terminally-unsaturated oligomers containing acid functionality.

Titanium dioxide (hereinafter referred to as "$TiO_2$") is the pigment of choice by most coatings manufacturers, particularly paint manufacturers, to provide whiteness and opacity or "hiding" to the final dried coating. $TiO_2$ is typically the most expensive raw material in a paint formulation. Thus, paint manufacturers have long sought to achieve the desired opacity by using the smallest amount of $TiO_2$ possible. A number of techniques have been employed, including inter alia:

(1) using $TiO_2$ that has an optimal average particle size and particle size distribution for light scattering;
(2) using $TiO_2$ that is well dispersed.

The opacifying capability or hiding power of a coating or paint is a function of the spacing of $TiO_2$ pigment particles in the dried coating. The light scattering characteristics of $TiO_2$ particles are well known and the average size and size distribution of the $TiO_2$ have been optimized by the $TiO_2$ manufacturers for maximum scattering. Maximum light scattering occurs when the $TiO_2$ pigment particles have a diameter of 200–250 nanometers (nm) and are spaced apart from each other, on the order of a few particle diameters, so that there is minimal interference between the light scattering of neighboring particles.

In an effort to achieve the proper spacing of the pigment particles, $TiO_2$ manufacturers have attempted a number of techniques, including encapsulating $TiO_2$ particles with a variety of different polymers (either fully in the form of a coating or partially in the form of nodules) or adsorbing a variety of different materials, including polymers (either film-forming or non-film-forming), onto the surface of the $TiO_2$ particles. U.S. Pat. No. 5,412,019, for example, discloses the use of preformed polymer particles that are chemically bonded to a polymeric water-soluble compound having a weight-average molecular weight (hereinafter referred to as "Mw") of at least 1,500, preferably greater than 20,000, prior to chemical bonding and containing moieties that are adsorbable onto the $TiO_2$ particles.

The polymeric water-soluble compounds described in U.S. Pat. No. 5,412,019 contain moieties that permit adsorption onto the $TiO_2$ particles through a balance of ionic, steric and van der Waals' forces. One serious drawback of using these water-soluble compounds in the manner described in U.S. Pat. No. 5,412,019 is that the use of high amounts of water-soluble compounds containing the adsorbing moieties (high use levels, high molecular weights or both) compromises the water-resistance properties of the final coating. Furthermore, high molecular weight water-soluble compounds may detrimentally contribute to instability and/or flocculation of a paint composition. Thus, a delicate balance must be struck to achieve a polymer that absorbs onto the $TiO_2$ particles to give the proper spacing while not detrimentally affecting the properties of the coating formulation and the final dried coating, especially those related to water resistance. Applicants have achieved this balance.

STATEMENT OF THE INVENTION

The invention is directed to a composite, containing:
a. pigment particles; and
b. a plurality of discrete polymer particles adsorbed onto the surface of the pigment particles;

wherein the polymer particles are formed from 0.05% by weight to 20% by weight, based on the weight of the polymer particles, of at least one terminally unsaturated oligomer of the formula:

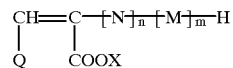

wherein N is the residue of an ethylenically unsaturated monomer of the formula:

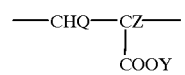

wherein M is the residue of an ethylenically unsaturated acrylic or vinyl monomer other than N;

wherein said N and M residues are randomly arranged in said oligomer;

wherein m is the total number of M residues in said oligomer and is in the range 0 to 35;

wherein n is the total number of N residues in said oligomer and is in the range 1 to 70;

wherein the sum of n and m is in the range from 1 to 70;

wherein X and each Y is independently selected from the group consisting of H, $NH_4$, alkali metals and alkaline earth metals;

wherein each Q is independently selected from the group consisting of H and COOX; and wherein each Z is independently selected from the group consisting of H and $CH_3$.

The invention is also directed to a coating composition, particularly a paint, containing these composite particles.

The invention is further directed to a process for preparing an aqueous dispersion of polymer-pigment composite particles, including the steps of:

(1) dispersing pigment particles in a first aqueous medium;
(2) preparing a dispersion or suspension of discrete polymer particles in a second aqueous medium, the polymer particles formed from 0.05% by weight to 20% by weight, based on the weight of the polymer particles, of at least one terminally unsaturated oligomer of the formula:

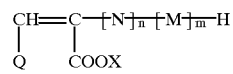

wherein N is the residue of an ethylenically unsaturated monomer of the formula:

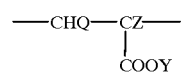

wherein M is the residue of an ethylenically unsaturated acrylic or vinyl monomer other than N;

wherein said N and M residues are randomly arranged in said oligomer;

wherein m is the total number of M residues in said oligomer and is in the range 0 to 35;
wherein n is the total number of N residues in said oligomer and is in the range 1 to 70;
wherein the sum of n and m is in the range from 1 to 70;
wherein X and each Y is independently selected from the group consisting of H, NH$_4$, alkali metals and alkaline earth metals;
wherein each Q is independently selected from the group consisting of H and COOX; and
wherein each Z is independently selected from the group consisting of H and CH$_3$;
(3) mixing the first aqueous medium and the second aqueous medium;
(4) permitting the polymer particles to adsorb onto the pigment particles to form composite particles; and
(5) optionally, providing dibasic phosphate to the composite particles.

The invention is also directed to a process for preparing an aqueous dispersion of polymer-pigment composite particles, including the steps of:
(1) preparing a dispersion or suspension of polymer particles in an aqueous medium, the polymer particles formed from 0.05% by weight to 20% by weight, based on the weight of the polymer particles, of at least one terminally unsaturated oligomer of the formula:

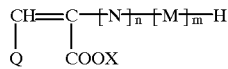

wherein N is the residue of an ethylenically unsaturated monomer of the formula:

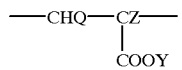

wherein M is the residue of an ethylenically unsaturated acrylic or vinyl monomer other than N;
wherein said N and M residues are randomly arranged in said oligomer;
wherein m is the total number of M residues in said oligomer and is in the range 0 to 35;
wherein n is the total number of N residues in said oligomer and is in the range 1 to 70;
wherein the sum of n and m is in the range from 1 to 70;
wherein X and each Y is independently selected from the group consisting of H, NH$_4$, alkali metals and alkaline earth metals;
wherein each Q is independently selected from the group consisting of H and COOX; and
wherein each Z is independently selected from the group consisting of H and CH$_3$;
(2) dispersing pigment particles in the aqueous medium;
(3) permitting the polymer particles to adsorb onto the pigment particles to form composite particles; and
(4) optionally, providing dibasic phosphate to the composite particles.

In addition, the invention is directed to a method of improving the opacity of a coating composition, including the steps of:
(1) dispersing pigment particles in a first aqueous medium;
(2) preparing a dispersion or suspension of polymer particles in a second aqueous medium, the polymer particles are formed from 0.05% by weight to 20% by weight, based on the weight of the polymer particles, of at least one terminally unsaturated oligomer of the formula:

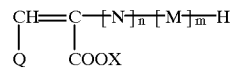

wherein N is the residue of an ethylenically unsaturated monomer of the formula:

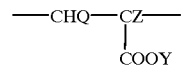

wherein M is the residue of an ethylenically unsaturated acrylic or vinyl monomer other than N;
wherein said N and M residues are randomly arranged in said oligomer;
wherein m is the total number of M residues in said oligomer and is in the range 0 to 35;
wherein n is the total number of N residues in said oligomer and is in the range 1 to 70;
wherein the sum of n and m is in the range from 1 to 70;
wherein X and each Y is independently selected from the group consisting of H, NH$_4$, alkali metals and alkaline earth metals;
wherein each Q is independently selected from the group consisting of H and COOX; and
wherein each Z is independently selected from the group consisting of H and CH$_3$;
(3) mixing the first aqueous medium and the second aqueous medium;
(4) permitting the polymer particles to adsorb onto the pigment particles to form composite particles;
(5) optionally, providing dibasic phosphate to the composite particles;
(6) adding the composite particles to a coating formulation; and
(7) applying the coating formulation to a substrate.

DETAILED DESCRIPTION OF THE INVENTION

The present invention provides a controlled adsorption process for preparing an aqueous dispersion of composite particles, the composite particles each including a plurality of polymer particles adsorbed onto a pigment particle. In the present invention, long term aggregation of the composite particles, which may otherwise adversely increase viscosity, is avoided. The resulting composite particles provided by the present invention can be used in preparing formulated aqueous compositions, such as coating compositions, including paints, primers and varnishes, binders for non-wovens and textiles, electronic chemicals, powder coatings, dispersants such as pigment dispersants, paper coatings, leather treatments, adhesives, floor polishes, caulks, and elastomeric wall mastics, which in turn give coatings which show improved opacity compared to prior art formulations. The coatings compositions themselves show good viscosity stability, and enhanced resistance to flocculation during preparation. In addition, benefits in a variety of coatings applications properties, including hiding, gloss, thickener efficiency, slurry compatibility, flow and leveling, color acceptance, color float, syneresis, whiteness, metal marring resistance, and water spot resistance are provided.

In one aspect of the process of the present invention, the pigment particles are dispersed in a first aqueous medium to form a slurry or pigment grind. This step can be carried out by the pigment supplier to give a pigment slurry ("slurry grade pigment"), or a dry grade of pigment can be used to prepare a slurry at the site where the coating composition is being prepared. Subsequently, this first aqueous dispersion is mixed with a second aqueous medium including dispersed polymer particles. The polymer-pigment composite of the invention then may be added to paint composition, for example. Alternatively, the polymer-pigment composite may be formed in the paint composition in situ by first dispersing the pigment particles in a first aqueous medium that is subsequently added to a second aqueous medium that contains dispersed polymer particles, such as a paint formulation letdown. Preferably, the first aqueous dispersion containing the pigment particles is added to the second aqueous dispersion containing the polymer particles rather than visa versa. In another aspect of the process of the present invention, the pigment particles may be dispersed directly in an aqueous medium which already contains the polymer particles.

The polymer particles useful in the composite and process of the invention are formed from a mixture of monomers, wherein at least one of the monomers is a terminally-unsaturated oligomer of a specific composition. These polymer particles adsorb to pigment particles.

If desired, an inorganic particle dispersant can be employed, although it is preferred to avoid particle dispersants which are believed to reduce the extent to which the selected polymer particles adsorb to the titanium dioxide particles, such as those which include a large proportion of acid-functional residues, such as salts of polyacids, for example, sodium polyacrylate. Such particle dispersants can be referred to as "strong" dispersants.

In some cases it has been observed that the viscosity of fully formulated coatings compositions including composite particles having polymer latex particles adsorbed to pigment particles has not been stable, and has tended to increase with time. This effect is believed to be related to the continued adsorption of the selected polymeric latex particles to titanium dioxide particles during storage, and to the possible formation of aggregates of composite particles which include two or more titanium dioxide particles. The continued increase in viscosity during storage is generally undesirable for many applications, as coatings compositions are frequently formulated to exhibit a desired, predetermined viscosity and/or rheology during application. Some control the upward drift in viscosity in such systems can be achieved by addition of a dispersant or electrolyte and/or by optimizing the particle size of the polymer particles so that the number ratio of polymer particles to pigment particles is great enough to maximize coverage of the pigment particle surface with adsorbed polymer particles.

Thus, the present invention provides a means of causing the polymer particles to adsorb to the pigment particles to form the composite particles, enhancing the storage stability of products formulated using the composite particles while reducing the water sensitivity of the final coating composition into which the composite particles are incorporated.

As an additional means to provide controlled adsorption of the polymer particles onto the pigment particles, a dibasic phosphate may optionally be added to the composite particles. Dibasic phosphate can be provided by adding a water-soluble dibasic phosphate salt to the composite particles. Examples of water-soluble dibasic phosphate salts that may be employed include dibasic ammonium phosphate, dibasic sodium phosphate and dibasic potassium phosphate. Dibasic ammonium phosphate is especially preferred, as the pH of coatings compositions is often adjusted with ammonia. The evaporation of ammonia after application of the coating composition reduces the water sensitivity of the coating which might otherwise result from the presence of non-volatile salt counterions such as sodium or potassium. The dibasic phosphate may be prepared as an aqueous solution from phosphoric acid and ammonia, by dissolving solid dibasic ammonium phosphate in water, from a solution of monobasic ammonium phosphate, etc. Other sources of dibasic phosphate include polyphosphates such as pyrophosphates and hexametaphosphates.

Pigment particles useful in the invention are generally inorganic and organic compounds and include, but are not limited to, titanium dioxide pigments, zinc oxide pigments, antimony oxides, barium pigments, calcium pigments, zirconium pigments, chromium pigments, iron pigments, magnesium pigments, lead pigments, zinc sulfide, lithopone and phthalo blue. Preferably, the pigment particles are titanium dioxide and, most preferably, they are rutile titanium dioxide. The pigment particles may be uncoated or coated with a conventional pigment coating.

Titanium dioxide particles are available commercially both in the form of aqueous slurries and as dry pigment, and with a variety of surface treatments, depending on the intended application. Some components of commercially available slurries, such as sodium or ammonium polyelectrolyte dispersants, may inhibit adsorption of the polymer particles on the titanium dioxide particles, as may certain surface treatments. Consequently, the extent and strength of adsorption depends on both the grade and physical form of the titanium dioxide and the identity of the polymer particles employed. The present invention provides a means of increasing the hiding obtainable and of reducing the variability in hiding otherwise associated with different grades of titanium dioxide.

Titanium dioxide particles which have been subjected to prior surface treatment processes can be used in the process of the present invention. Titanium dioxide pigment is available in various grades from several suppliers, with specific titanium dioxide grades being optimized by the supplier for intended end use application, such as for high gloss paints, for general purpose applications, and the like. Titanium dioxide particles can be prepared by either the chloride process or sulfate process, and the method of preparation may affect the physical and chemical properties of the products, including the surface properties. The titanium dioxide particles can be pretreated to provide inorganic surface coatings, such as coatings of silica, aluminum oxide, zirconium oxide, or mixtures of silica and aluminum oxide, on titanium dioxide pigment particles, as discussed in A. Brisson et al., *J. Coatings Tech.* 63, 59–65 (1991). Similarly, proprietary organic coatings are sometimes employed by suppliers of titanium dioxide pigments.

In addition, small molecular species, such as silanes or titanates, can be adsorbed on and reacted with surface of the titanium dioxide particles, and the resulting surface sites can be subsequently modified chemically. Examples of such species include N-2-aminoethyl-3-aminopropyltrimethoxysilane, 3-aminopropyltrimethoxysilane, 3-methacryloxypropyl-trimethoxysilane, and vinyltriacetoxysilane. Alternatively, other species can be simply adsorbed to the surface of the titanium dioxide pigment particles. The most important examples of these are low molecular weight polyelectrolytes such as conventional pigment dispersants.

The practice of the process of the present invention depends on the specific grade of titanium dioxide employed. It is not presently understood what determines whether the present process can be employed, although it is believed that the surface characteristics of the titanium dioxide may be important. Nevertheless, whether the present process can be employed to yield improved coating properties with respect to a specific grade of titanium dioxide can be readily determined empirically.

The crux of the invention is the use of polymer particles that have been formed from a monomer mixture which contains at least one terminally-unsaturated oligomer having acid functionality. More specifically, the polymer particles useful in the invention are formed from 0.05% by weight to 20% by weight, based on the weight of the polymer particles, of at least one terminally unsaturated oligomer of the formula:

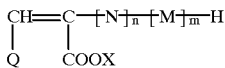

wherein N is the residue of an ethylenically unsaturated monomer of the formula:

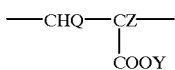

wherein M is the residue of an ethylenically unsaturated acrylic or vinyl monomer other than N;

wherein said N and M residues are randomly arranged in said oligomer;

wherein m is the total number of M residues in said oligomer and is in the range 0 to 35;

wherein n is the total number of N residues in said oligomer and is in the range 1 to 70;

wherein the sum of n and m is in the range from 1 to 70;

wherein X and each Y is independently selected from the group consisting of H, $NH_4$, alkali metals and alkaline earth metals;

wherein each Q is independently selected from the group consisting of H and COOX; and wherein each Z is independently selected from the group consisting of H and $CH_3$.

The term "said N and M residues are arranged randomly in said oligomer" means that the residue adjacent the terminally unsaturated moiety may be either an N or an M residue, that the residue adjacent the residue adjacent the terminally unsaturated moiety may be either an N or an M residue, and so on. Thus, it is possible that the terminally-unsaturated oligomer useful in the invention is a homopolymer of N residues or is a copolymer of N residues and M residues, arranged either as a random copolymer or block copolymer. The oligomers may be either linear or branched, preferably the oligomers are linear.

Preferably Q, X, Y, and Z are H. M is preferably a residue of the formula:

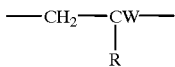

where W is —H or —$CH_3$;
where R is a phenyl radical, a vinyl radical, —$CONH_2$, —CN or —$COOX_2$; and where $X_2$ is ($C_1$–$C_8$) alkyl radical, a vinyl radical, or an allyl radical.

Preferably, the ratio of n:m is in the range of 1:0 to 3:1, more preferably 1:0 to 9:1. Most preferably, the ratio of n:m is 1:0. Preferably, n is no greater than 20, m is no greater than 10 and the sum of n and m is no greater than 20.

The terminally-unsaturated oligomers useful in the invention may be prepared by any conventional technique, including those disclosed in U.S. Pat. Nos. 4,056,559; 4,680,352; 4,694,054; 5,028,677; 5,587,431; 5,710,227; and EP-0,779, 305.

The monomer mixture employed to form the terminally-unsaturated oligomers useful in the invention includes monomer containing acid functionality, preferably carboxylic acid functionality. Suitable acid functional monomers include $C_3$–$C_6$ monoethylenically unsaturated monocarboxylic acids, and the alkali metal and ammonium salts thereof, such as, for example, acrylic acid, methacrylic acid, crotonic acid, vinylacetic acid, and acryloxypropionic acid and salts thereof; $C_4$–$C_8$ monoethylenically unsaturated dicarboxylic acids and the alkali metal and ammonium salts thereof, and the anhydrides of the cis-dicarboxylic acids such as, for example, maleic acid, maleic anhydride, itaconic acid, mesaconic acid, fumaric acid, citraconic acid, tetrahydrophthalic anhydrides, cyclohexene dicarboxylic acids and salts thereof.

A wide variety of monomers may be employed to form the balance, if any, of the monomer mixture used to form the oligomers useful in the invention. Suitable monoethylenically unsaturated monomers include acrylamide; alkyl esters of acrylic or methacrylic acids such as methyl acrylate, ethyl acrylate, butyl acrylate, methyl methacrylate, ethyl methacrylate, butyl methacrylate and isobutyl methacrylate; hydroxyalkyl esters of acrylic or methacrylic acids such as hydroxyethyl acrylate, hydroxypropyl acrylate, hydroxyethyl methacrylate, and hydroxypropyl methacrylate; acrylamide, methacrylamide, t-butylacrylamide, N,N-dimethylacrylamide, and acrylonitrile, N-tertiarybutylacrylamide, N-methylacrylamide, dimethylaminopropylmethacrylamide; methacrylonitrile, allyl alcohol, allylsulfonic acid, allylphosphonic acid, vinylphosphonic acid, dimethylaminoethyl acrylate, dimethylaminoethyl methacrylate, phosphoethyl methacrylate, N-vinylpyrrolidone, N-vinylformamide, N-vinylimidazole, vinyl acetate, styrene, styrenesulfonic acid and its salts, vinylsulfonic acid and its salts, and 2-acrylamido-2-methylpropanesulfonic acid and its salts. When used, the other monoethylenically unsaturated monomers may be present in the reaction mixture at a level of from 0.05% to 99% by weight, preferably from 1.0% to 95% by weight, most preferably from 5.0% to 90%, by weight, based on the weight of the oligomer.

The terminally-unsaturated oligomers are employed in a polymerization process with other ethylenically unsaturated comonomers to form the polymer particles useful in the composite of the invention. The terminally-unsaturated oligomers are incorporated into the polymer particles at a level of 0.05% by weight to 20% by weight, based on the weight of the polymer particle, preferably 0.1% by weight to 5% by weight, based on the weight of the polymer particle.

Suitable ethylenically unsaturated comonomers include α, β-ethylenically unsaturated monomers, including styrene, butadiene, α-methylstyrene, vinyltoluene, vinylnaphthalene, ethylene, vinyl acetate, vinyl versatate, vinyl chloride, vinylidene chloride, acrylonitrile, methacrylonitrile, (meth)acrylamide, various ($C_1$–$C_{20}$)alkyl esters of (meth)acrylic acid; for example, methyl (meth)acrylate, ethyl (meth)

acrylate, n-butyl (meth)acrylate, isobutyl (meth)acrylate, 2-ethylhexyl (meth)acrylate, cyclohexyl (meth)acrylate, n-octyl (meth)acrylate, n-decyl (meth)acrylate, n-dodecyl (meth)acrylate, tetradecyl (meth)acrylate, n-amyl (meth) acrylate, neopentyl (meth)acrylate, cyclopentyl (meth) acrylate, lauryl (meth)acrylate, oleyl (meth)acrylate, palmityl (meth)acrylate, and stearyl (meth)acrylate; other (methacrylates such as isobornyl (meth)acrylate, benzyl (meth)acrylate, phenyl (meth)acrylate, 2-bromoethyl (meth) acrylate, 2-phenylethyl (meth)acrylate, and 1-naphthyl (meth)acrylate; alkoxyalkyl (meth)acrylate such as ethoxyethyl (meth)acrylate; mono-, di-, and trialkyl esters of ethylenically unsaturated di- and tricarboxylic acids and anhydrides, such as ethyl maleate, dimethyl fumarate, trimethyl aconitate, and ethyl methyl itaconate. As used in the present specification and claims, "(meth)acrylate" denotes both "acrylate" and "methacrylate" and "(meth)acrylic" denotes both "methacrylic" and "acrylic."

In addition to those comonomers which are "functional" in the sense of including one or more polymerizable ethylenically unsaturated groups, monomers which also include one or more additional functional groups may be used in preparing the polymer particles used in the process of this invention. Suitable monomers containing functional groups include polymerizable ethylenically unsaturated monomers having acidic functional groups, such as acrylic acid, methacrylic acid, β-acryloxypropionic acid and higher monoacidic oligomers of acrylic acid, ethacrylic acid, α-chloroacrylic acid; α-vinylacrylic acid, crotonic acid, α-phenylacrylic acid, cinnamic acid, chlorocinnamic acid, β-styrylacrylic acid, itaconic acid, and maleic acid. Small amounts of acid-functional copolymerizable monomer, such as methacrylic acid and/or acrylic acid, are typically included in preparing polymeric latices to confer colloidal stability.

Other types of copolymerizable functional monomers may also be included in the monomer mixture to form the polymer particles useful in the composites of the invention, depending on the ultimate application for which the product produced by the process of the present invention is intended. For example, small amounts of adhesion-promoting copolymerizable monomers can also be included. Examples of other types of functional monomers include dihydrogen phosphate-functional monomers such as dihydrogen phosphate ester of 2-hydroxyethyl methacrylate; hydroxy-functional monomers such as, 2-hydroxyethyl (meth) acrylate, amino-functional monomers such as dimethylaminoethyl (meth)acrylate, epoxy-functional monomers, such as glycidyl methacrylate; acrylamide, methacrylamide, substituted acrylamides, diacetone acrylamide, acetoacetoxyethyl methacrylate, acrolein, methacrolein, dicyclopentadienyl methacrylate, dimethyl meta-isopropenyl benzyl isocyanate, isocyanato ethyl methacrylate, methyl cellulose, hydroxyethyl cellulose, ethylene, propylene, N-vinyl pyrrolidone, N,N'-dimethylamino(meth)acrylate and polymerizable surfactants, including, but not limited to, Trem LF-40 (Henkel Corporation).

The monomer mixture that is polymerized to form the polymer particles may also include at least one multi-ethylenically unsaturated monomer effective to raise the molecular weight and crosslink the polymer. Examples of multiethylenically unsaturated monomers that can be used include allyl (meth)acrylate, tripropylene glycol di(meth) acrylate, diethylene glycol di(meth)acrylate, ethylene glycol di(meth)acrylate, 1,6-hexanediol di(meth)acrylate, 1,3-butylene glycol di(meth)acrylate, polyalkylene glycol di(meth)acrylate, diallyl phthalate, trimethylolpropane tri (meth)acrylate, divinylbenzene, divinyltoluene, trivinylbenzene, and divinylnaphthalene.

The polymer particles useful in the composite of the invention may be prepared by any process which provides copolymerization of the select terminally-unsaturated oligomers, such as suspension polymerization or emulsion polymerization, including for example, the process disclosed in U.S. Pat. Nos. 5,356,968 and 5,264,530. The polymer particles useful in the composite of the invention may have monomer compositions, particle sizes and particle size distributions closely related to polymeric latex binders prepared by standard emulsion polymerization techniques known in the art. In addition, the polymer particles useful in the composite of the invention may have a unimodal or multimodal (e.g., bimodal) particle size distribution.

Emulsion polymerization techniques for preparing aqueous dispersions of latex polymer particles from ethylenically unsaturated monomers are well known in the polymer arts, and any conventional emulsion technique can be used, such as single and multiple shot batch processes, and continuous processes. If desired, a monomer mixture can be prepared and added gradually to the polymerization vessel. The monomer composition within the polymerization vessel can be varied during the course of the polymerization, such as by altering the composition of the monomer being fed into the vessel. Both single and multiple stage polymerization techniques can be used. The polymer particles can be prepared using a seed polymer emulsion to control the number of particles produced by the emulsion polymerization as is known in the art. The particle size of the polymer particles can be controlled by adjusting the initial surfactant charge as is known in the art. The preparation of polymeric latexes is discussed generally in D. C. Blackley, *Emulsion Polymerization* (Wiley, New York, 1975). The preparation of acrylic polymeric latexes is described in, for example, *Emulsion Polymerization of Acrylic Polymers,* Bulletin, Rohm and Haas Company, Philadelphia.

A polymerization initiator can be used in carrying out the polymerization of the polymeric latex particles. Examples of polymerization initiators which can be employed include polymerization initiators which thermally decompose at the polymerization temperature to generate free radicals. Examples include both water-soluble and water-insoluble species. Examples of free radical-generating initiators which can be used include persulfates, such as ammonium or alkali metal (potassium, sodium or lithium) persulfate; azo compounds such as 2,2'-azo-bis(isobutyronitrile), 2,2'-azo-bis(2, 4-dimethylvaleronitrile), and 1-t-butyl-azocyanocyclohexane); hydroperoxides such as t-butyl hydroperoxide and cumene hydroperoxide; peroxides such as benzoyl peroxide, caprylyl peroxide, di-t-butyl peroxide, ethyl 3,3'-di-(t-butylperoxy) butyrate, ethyl 3,3'-di(t-amylperoxy) butyrate, t-amylperoxy-2-ethyl hexanoate, and t-butylperoxy pivilate; peresters such as t-butyl peracetate, t-butyl perphthalate, and t-butyl perbenzoate; as well as percarbonates, such as di(1-cyano-1-methylethyl)peroxy dicarbonate; perphosphates.

Polymerization initiators can be used alone or as the oxidizing component of a redox system, which also includes a reducing component such as ascorbic acid, malic acid, glycolic acid, oxalic acid, lactic acid, thioglycolic acid, or an alkali metal sulfite, more specifically a hydrosulfite, hyposulfite or metabisulfite, such as sodium hydrosulfite, potassium hyposulfite and potassium metabisulfite, or sodium formaldehyde sulfoxylate. The reducing component is frequently referred to as an accelerator.

The initiator and accelerator, commonly referred to as catalyst, catalyst system or redox system, can be used in proportion from 0.001% to 5% each, based on the weight of monomers to be copolymerized. Accelerators such as chloride and sulfate salts of cobalt, iron, nickel or copper can be used in small amounts. Examples of redox catalyst systems include tertbutyl hydroperoxide/sodium formaldehyde sulfoxylate/Fe(II), and ammonium persulfate/sodium bisulfite/sodium hydrosulfite/Fe(II). The polymerization temperature can be from room temperature to about 90° C., and can be optimized for the catalyst system employed, as is conventional.

Chain transfer agents can be used to control polymer molecular weight, if desired. Examples of chain transfer agents include mercaptans, polymercaptans and polyhalogen compounds. Examples of chain transfer agents which may be used include alkyl mercaptans such as ethyl mercaptan, n-propyl mercaptan, n-butyl mercaptan, isobutyl mercaptan, t-butyl mercaptan, n-amyl mercaptan, isoamyl mercaptan, t-amyl mercaptan, n-hexyl mercaptan, cyclohexyl mercaptan, n-octyl mercaptan, n-decyl mercaptan, n-dodecyl mercaptan; alcohols such as isopropanol, isobutanol, lauryl alcohol and t-octyl alcohol; halogenated compounds such as carbon tetrachloride, tetrachloroethylene, and tricholorobromoethane. Generally from 0 to 10% by weight, based on the weight of the monomer mixture, can be used. The polymer molecular weight can be controlled by other techniques known in the art, such as selecting the ratio of initiator to monomer.

Catalyst and/or chain transfer agent can be dissolved or dispersed in separate or the same fluid medium and gradually added to the polymerization vessel. Monomer, either neat or dissolved or dispersed in a fluid medium, can be added simultaneously with the catalyst and/or the chain transfer agent. Amounts of initiator or catalyst can be added to the polymerization mixture to "chase" residual monomer after polymerization has been substantially completed to polymerize the residual monomer as is well known in the polymerization arts.

Aggregation of polymer particles is typically discouraged by including a stabilizing surfactant in the polymerization mix. In general, the growing latex particles are stabilized during emulsion polymerization by one or more surfactants such as an anionic or nonionic surfactant, or a mixture thereof, as is well known in the polymerization art. Many examples of surfactants suitable for emulsion polymerization are given in *McCutcheon's Detergents and Emulsifiers* (MC Publishing Co., Glen Rock, N.J.), published annually. Other types of stabilizing agents, such as protective colloids, may also be used. However, it is preferred that the amount and type of stabilizing surfactant or other type of stabilizing agent employed during the polymerization reaction be selected so that residual stabilizing agent in the aqueous product of the polymerization reaction does not significantly interfere with the subsequent opacity improvement of the process of the present invention. Further, charged initiator fragments and copolymerized monomer bearing charged functional groups such as copolymerized acid-functional monomers are known to contribute to the stability of the resulting polymeric latex particles. It is important to note that stabilizing surfactants, copolymerized strongly acidic monomers, residual initiator fragments, and the like, may also interfere with the subsequent opacity improvement of the process of the present invention. Thus adjusting polymerization conditions to provide a desired level of residual initiator fragments and surface acid may be very important in providing polymeric latex particles for use in the process of the present invention.

The polymer particles useful in the composite of the invention have an Mw of at least 100,000, preferably of at least 500,000, more preferably of at least 750,000, and most preferably of at least 1,000,000, as measured by gel permeation chromatography.

In one embodiment of the present invention, the polymer particles are preferably polymeric latex particles polymerized from monomer which provides polymer which is hard or rigid at the temperature at which the aqueous composition is to be used, such as monomer which provides a polymeric material with an effective glass transition temperature of at least about 20° C., more preferably at least about 35° C., and even more preferably at least about 50° C. in the case of a composition applied at ambient or room temperature (that is, at about 20–23° C.). Higher temperature ranges may be more appropriate for applications at higher temperatures, such as baked coatings.

In a second embodiment of the present invention, the process of this invention contemplates preparing a mixture of at least two types of polymer particles, the first type being the polymer particles formed from a terminally unsaturated oligomer, and preferably having an effective glass transition temperature of at least about 20° C., more preferably at least about 35° C., and even more preferably at least about 50° C. The second type of polymer particle is provided to form a binder for the titanium dioxide pigment particles. The mixture can be used to prepare formulated compositions, such as coating compositions, which show improved opacity.

In a third embodiment of the present invention, the polymer particle has a relatively low effective glass transition temperature, that is, from about –50° C. to about 30° C., and serves as a binder for the composition.

In yet another embodiment, two or more types of soft polymer particles are employed as binders, one or more of these being the polymer particles containing acid functionality.

In addition to the composite particles, other components can be added to the aqueous composition to which the composite particles are added depending on the application of the aqueous composition. For example, a film-forming binder such as a relatively soft polymeric latex can be included, as well as other conventional components used to provide a formulated coating composition, such as coalescents, preservatives, thickeners, and rheology control agents. In addition, the aqueous compositions of the present invention may include other optional components, including without limitation, other polymers, surfactants, extenders, pigments and dyes, pearlescents, adhesion promoters, crosslinkers, dispersants, defoamers, leveling agents, optical brighteners, uv stabilizers, coalescents, rheology modifiers, preservatives, biocides and antioxidants.

The improved opacity and other coatings performance properties provided by the present invention advantageously provide greater flexibility in preparing aqueous compositions containing the polymer-pigment composite of the invention. For example, in some cases the present process provides a means of reducing the amount of titanium dioxide pigment required to provide the desired opacity. When the polymer-pigment composites are used in coating compositions, the present method provides improved coating properties, such as opacity or hiding, heat age resistance of hiding, whiteness, tint strength, mechanical properties, low shear viscosity, "ICI" or "cone-and-plate" (high shear rate) viscosity, gloss, and scrub resistance relative to systems that do not contain the polymer-pigment composites. The method also provides coating compositions giving coatings with improved opacity for a given titanium dioxide pigment level. An important improvement provided by the process of the present invention is an improvement in the color acceptance of formulated coatings compositions. Similarly, improvements can be obtained in the mechanical stability, the chemical stability, the tendency of added colorant to separate, and the metal marring resistance.

The polymer particles of this invention are particularly useful for improving the performance properties of coatings and paints formed therefrom. Alternatively, the invention offers the ability to formulate coatings and films of substantially equal performance properties as conventional systems but with lower concentrations of expensive titanium dioxide pigment, and accordingly at lower cost. The present invention further contemplates preparing fully formulated aqueous compositions, including aqueous coating compositions, using the polymer-pigment composites, and the subsequent use of the fully formulated aqueous compositions to form products, including coatings, and coated articles.

The process of this invention contemplates preparing a dispersion or suspension of polymer particles in the aqueous medium. These polymers particles are selected to adsorb onto the dispersed titanium dioxide particles to provide composite particles, each including both a titanium dioxide particle and adsorbed polymer particles. The titanium dioxide particles remain dispersed in the aqueous medium during and after adsorption of the polymeric latex particles, that is, during their transformation into composite particles. The polymer particles may be selected to strongly adsorb onto the titanium dioxide particles. In some cases, the polymer particles are believed to, in effect, irreversibly adsorb onto the pigment particles. In at least some cases, it is believed that previously adsorbed pigment dispersant is displaced by the adsorbed polymeric latex particles.

The process of the present invention employs polymer particles formed from oligomers containing acid functionality for use in aqueous compositions including titanium dioxide pigment particles. In many cases, the titanium dioxide pigment particles are initially dispersed using a pigment dispersant, such as a polyelectrolyte dispersant, or a steric stabilization agent.

The process provides a solution to the problem of how to practically utilize polymer particles formed from oligomers containing acid functionality to improve the opacity of aqueous-based coatings containing high concentrations of titanium dioxide pigment particles by adsorption of the selected polymer particles to titanium dioxide particles to form composite particles for preparing fully formulated coatings compositions, while increasing the long-term stability of the fully formulated coatings compositions and without detrimentally affecting the water sensitivity properties of the final coatings.

Polymer particles formed from oligomers containing acid functionality, size and surface charge can be effectively used in the process of the present invention along with pigment particles, in concentrated dispersions. The polymer particles are believed to function in the process by adsorbing onto the surface of the pigment particles in the presence of any initially adsorbed pigment dispersant. While not being bound by any particular theory of the molecular mechanism of the process of the present invention, it is presently believed that the initial pigment dispersant adsorbed to the surface of the pigment particles is in equilibrium with initial pigment dispersant in the aqueous medium, that the initial pigment dispersant does not completely cover the surface of the titanium dioxide particles at all times, and that at least a portion of the surface of the titanium dioxide particle is available for adsorption of the selected polymer particles.

The preferred polymer particles are believed to adsorb essentially irreversibly on the surface of the polymer particles, so that in time the initial pigment dispersant is replaced at least to some extent on the surface by the polymer particles. The polymer particles are preferably selected to provide this strong adsorption.

The present process is particularly useful for improving the opacity, gloss, high shear viscosity, color development, permeability, and mechanical properties of coatings and films formed therefrom. Alternatively, the invention offers the ability to formulate coatings and films of substantially equal performance properties as conventional systems but with lower pigment particle concentrations and accordingly at lower cost.

The process of the present invention is particularly useful in the alkaline pH range in which aqueous coatings compositions and paints are frequently formulated, such as from about 7 to 10.

The process of the present invention is believed to be dependent to some extent on the relative concentrations and particle sizes of the polymer particles and the pigment particles with more polymer particles being required at a higher concentrations of pigment for optimum performance. Preferably, enough of the polymer latex is employed to obtain optimum performance properties in fully formulated products prepared using the process.

In preparing coating formulations possessing desirable performance properties it is not necessary that the polymer particles used in the process of the invention also function as the polymeric binder for the coating or film, although this may be possible or even desirable in some cases, as in one presently preferred embodiment. Instead, another polymer latex, preferably having a glass transition temperature tending to provide good film formation properties under the application conditions, can be provided to serve this function. By "glass transition temperature" is meant the second order phase transition temperature by as measured by differential scanning calorimeter at a rate of 20° C./minute; as determined empirically by mechanical methods as torsional braid analysis, dynamic mechanical analysis and the like; or as calculated from monomer composition by the method of Fox. By "effective glass transition temperature" is meant the second order phase transition temperature of the polymeric material as modified by the presence of low molecular weight species such as coalescents, solvent, and the like. The function of the polymer particles of the invention, in contrast, is to improve the opacity of the film formed by the polymeric binder latex and the titanium dioxide pigment particles. To serve this function, it may be desirable that the polymer particles be relatively rigid, having a relatively high effective glass transition temperature under the application conditions, for example, at least about 20° C., more preferably at least about 35° C., and even more preferably at least about 50° C. Thus, a first presently preferred embodiment of the present invention provides an aqueous mixture of the selected, opacity-improving "hard" polymeric latex particles and the non-selected, film-forming "soft" polymeric latex particles for use in preparing formulated aqueous compositions, such as coating compositions.

In one embodiment of the process of the present invention, the polymer particles do not themselves provide a binder for the product formed by the fully formulated aqueous composition. Because they are not required to flow and form a film, the particles can be more rigid than those employed to provide a binder. Thus, the polymer particles can have a higher effective glass transition temperature than polymeric particles employed to serve as binder, and/or can include rigidifying levels of crosslinking. In this case the polymer particles latex can also be prepared by standard emulsion polymerization techniques, but typically will not be suitable for use as a film-forming binder.

With regard to the average particle size or diameter of the polymer particles and the pigment particles employed in the present process, it is generally preferred that the polymer particles have an average diameter of from 20 nanometers ("nm") to four times that of the pigment particles, and more preferably from 20 nm to the same diameter as that of the titanium dioxide pigment particles. In one presently preferred embodiment, in the case of selected "hard" polymeric latex particles, an average polymer latex diameter from 30 nm to 100 nm is preferred, and an average polymer latex diameter from 50 nm to 80 nm is especially preferred. By "average particle size" or "average particle diameter" is meant an average determined experimentally by the quasielastic light scattering technique, such as provided, for example, by the Model BI-90 Particle Sizer, of Brookhaven Instruments Corporation.

In another embodiment of the process of the present invention, the polymer particles themselves do provide a binder for the product formed by the fully formulated aqueous composition. In this case an average polymer particle diameter of from about 80 nm to 600 nm is preferred, and an average particle diameter of less than 135 nm is more preferred, and a particle size of 105 nm is especially preferred. In this case the polymer particles can also be prepared by standard emulsion polymerization techniques. The optimum size of the polymer particles is believed to depend to some extent on the level of the functionality incorporated in the polymer particles, with particle size varying inversely with the level of functionality.

The concentration of the titanium dioxide particles (and any other pigments and/or extenders which may be present in the composition) in a coating formulation is expressed in terms of the pigment volume concentration of the formulation. The pigment volume concentration (hereinafter referred to as the "PVC") of a formulation is defined as the volume amount of inorganic particles, including titanium dioxide and other pigment particles as well as extender particles, present in the formulation, divided by the sum of the volume amount of such inorganic particles plus polymeric latex particle solids in the formulation and expressed herein as a percentage. The composite particles may improve the opacity or hiding of a coating formulated over any PVC range. Preferably, the PVC of compositions prepared according to the present invention is from 5% to 85%, and more preferably from 10% to 60%.

The overall concentration of pigment particles, extender particles and polymer particles in a formulation is typically expressed in terms of a % volume solids for the formulation. The % volume solids is an expression of the extent of the dilution of the solids in a liquid vehicle, such as water. The composites of the invention are useful in coating formulations having % volume solids of 20% to 50%, preferably 25% to 42%.

While the chemical composition of a polymer binder is important for achieving the resultant properties of the coating or film when the polymer particles also acts as the binder, the glass transition temperature and amount of acid functionality in the polymer particles can also be important for the purpose of the invention.

In the case in which the polymer particles are used as the sole binder for a semi-gloss paint or a flat paint formulated at below the critical pigment volume concentration, a particle size of about 105 nm is preferred for the polymer particles. It has been found that this particle size of allows successful formulation of semi-gloss and flat paints for most grades of titanium dioxide particles. Under these conditions, it is presently understood that this particle size provides sufficient numbers of binder particles so that the titanium dioxide particle surface is saturated, thereby preventing the bridging flocculation. If the PVC is raised too high, or if a second, non-adsorbing polymer binder is substituted for some of the selected polymer particles, some bridging flocculation and concomitant grit formation may result.

Generally, low levels of fairly weak dispersants are desirable in paints prepared by the process of the present invention. For example, 0.5% TAMOL™ SG-1 dispersant (Rohm and Haas Company, Philadelphia, Pa.) or, alternatively, TAMOL™ 1124 dispersant (Rohm and Haas Company, Philadelphia, Pa.) is preferred for a dry grade of titanium dioxide pigment, as it is presently believed that the selected polymeric latex particles must be able to compete effectively with the dispersant for adsorption to the surface of the titanium dioxide particles. Further, the ultimate stability of the paint is provided by the adsorbed selected polymeric latex particles, so high levels of dispersant are not needed. The dispersants employed in commercial titanium dioxide slurries are generally believed to be sufficient, and no additional pigment dispersants are believed required when slurry grade titanium dioxide particles are employed in the process of this invention. Conversely, use of high levels of high acid dispersants is believed to effectively block adsorption.

Examples of suitable anionic polyelectrolyte pigment dispersants for use in the process of the present invention include copolymers including copolymerized maleic acid, copolymers including copolymerized acrylic acid, copolymers including copolymerized methacrylic acid, and the like.

The presence of conventional polyelectrolyte dispersants has a significant effect on the opacity improvement of the present invention. While low concentrations of conventional water-soluble polyelectrolyte dispersants, on the order of about 0.5% by weight or lower, have little adverse effect on the opacity improvement, the use of higher concentrations of these conventional water-soluble polyelectrolytes dispersants can have a significant adverse effect upon opacity. This is presently believed to be related to reduction in the adsorption of the polymeric latex particles on the titanium dioxide particles.

In some cases, it is possible to practice the process of the present invention without employing a pigment dispersant to disperse the titanium dioxide pigment particles, although in others it is generally preferred that a pigment dispersant be used.

The adsorption of polymer particles on pigment particles is presently believed to be a complex function of the type and level of adsorbing moiety on the pigment particles surface, the surface treatment on the pigment particle's surface, the pigment and binder surface area, the level and type of dispersants present in the mixture, the type of thickener used, the ionic strength of the mixture, and the presence or absence of other, competing molecules. Together, these factors are believed to determine the adsorption level, thereby affecting viscosity and viscosity stability, hiding, gloss, and block.

The process of the present invention can significantly increase the hiding of titanium dioxide containing emulsion paint formulations (as determined by measuring the scattering coefficient of the paint) of the same PVC compared with the scattering coefficient of a paint formulation prepared by the use of conventional polymeric latices. An alternate way of expressing this improvement is that the process of the invention permits the reduction of the PVC of a 20% PVC titanium dioxide paint formulation by as much as 20% or more while achieving the same scattering coefficient or degree of hiding as can be obtained by the use of a conventional polymeric latex.

Furthermore, the improved performance of paint formulations prepared by the present process is achieved even in the presence of substantial amounts of large particle size extenders, such as calcium carbonate and alumino silicate, typically employed in such formulations.

In addition, the improved hiding achievable by use of the process of this invention is realized when the coating formulation is prepared with conventional thickeners of the associative and non-associative types. This improvement is dependent upon the selected thickener. Because the hiding achievable using associative thickeners is often greater than that achievable using conventional thickeners such as hydroxyethylcellulose ("HEC") thickeners, a greater increase in hiding can often be achieved by employing the process of the present invention with a conventional thickener such as HEC than is achievable with an otherwise equivalent coatings formulation employing an associative thickener. However, both versions of coatings compositions thickened with cellulosic thickeners and the otherwise equivalent versions thickened with associative thickener show comparable levels of hiding when the present process is employed. Thus, when the process of the present invention is employed, the level of hiding tends to be independent of the type of thickener employed. This result is surprising and contrary to the result typically encountered when paints are formulated using conventional polymeric latices. In such conventional systems the hiding property of the formulated paint can vary greatly as a function of the thickener employed. The process of the invention therefore offers paint formulators a greater choice in selecting thickeners for the final paint formulation without concern over the choice of thickener adversely affecting the final hiding properties of the paint.

In some cases there appears to be a relationship between the type of thickener and type of pigment dispersant employed and the efficacy of adsorption. For example, if a conventional hydroxyethyl cellulose thicker is employed, it may be possible to employ a high acid pigment dispersant such as TAMOL™ 731 dispersant (Rohm and Haas Company, Philadelphia, Pa.), whereas the same paints thickened with an associative thickener may not have adsorption. It has been observed that the level of thickener required in paints prepared according to the present invention is often substantially lower than that required for the conventional paints. It appears that the composite particle has a higher effective volume than the corresponding titanium dioxide particle, thus generally giving the paints higher viscosity. In addition, some loose association of the composite particles may contribute to the high viscosities sometimes observed.

Furthermore, in addition to improving the hiding of paint formulations, the process of this invention also has been found to advantageously improve the color acceptance, metal marring resistance, gloss, and high shear viscosity of paint formulations compared with paint formulations prepared with conventional polymeric latices, as well as improving the corrosion resistance of paint formulations.

In addition to the titanium dioxide particles, which are typically of relatively small particle size, on the order of 200–250 nm, other pigment particles, such as the large particle size extender pigment particle typically included in many types of coating formulation to reduce raw material costs, can also be employed in addition to the titanium dioxide pigment particles in the process of the present invention. Examples of large particle size extender pigment particles which can be used include calcium carbonate, alumino-silicate, amorphous silica, and the like.

It is preferred that extender grinds be added to the composite particles after it has stirred for at least one hour, if possible. At least in some cases, addition of the extender grind prematurely, or grinding the extender with the titanium dioxide in a common grind, has been found to result in lower hiding.

Similarly, the aqueous medium in which the titanium dioxide particles are ground with the polymeric latex dispersant can also include water-miscible solvents, such as glycols and glycol ethers, such as are conventional in the coatings arts. Examples of water-miscible solvents employed include, but are not limited to, propylene glycol, ethylene glycol, and ethylene glycol monomethyl ether.

Aqueous coating compositions are frequently formulated at alkaline pH to stabilize anionically charged latex binder against agglomeration and for other reasons. The principles of formulating aqueous coating compositions are reviewed, for example, in *Formulation of Organic Coatings* (N. I. Gaynes ed. D. Van Nostrad Co. Inc. Princeton, N.J. 1967) at pages 189–230. Often the binder-forming latex polymer particles contain carboxyl functional groups. Under suitable conditions, the carboxyl groups are ionized and the resultant charges on the latex particle surface electrostatically stabilize the latex against premature agglomeration. Often a volatile base, typically ammonia, is used to adjust the pH of the coating composition. When the coating composition is applied to a substrate to be coated, the volatile base is lost and the pH of the coating composition drops, destabilizing the latex particles of the binder and thus encouraging agglomeration to form a continuous binder film.

In addition to binder-forming polymeric latex particles, selected polymeric latex particles, and titanium dioxide pigment particles, aqueous coating compositions prepared according to the process of the present invention can include typical coatings ingredients. For example, they can include extender pigments as noted above such as calcium carbonate, amorphous silica, and the like; defoamers; biocidal agents such as zinc oxide, 2-N-octyl-4-isothiazole-3-one, and phenyl mercuric acetate; coalescing agents such as diethylene glycol monoethyl ether acetate and ethylene glycol monobutyl ether acetate; plasticizers such as dialkyl phthalates including dibutyl phthalate and dioctyl phthalate; freeze-thaw stabilizers such as ethylene glycol, propylene glycol and diethylene glycol; nonionic wetting agents such as polyethylenoxylates of fatty acids, alkanols, alkylphenols, and glycols; polyelectrolyte pigment dispersants; thickeners such as polyelectrolyte and cellulosic thickeners; rheology control agents such as associative thickeners; colorants such as colored pigments and dyes; perfumes; and cosolvents.

With respect to the order of addition, it is preferred that the titanium dioxide pigment grind or slurry be added to the aqueous dispersion of the polymer particles, rather than visa versa, so that situations in which there is a temporary "excess" of titanium dioxide particles relative to polymeric latex particles, and the possibility of grit formation through bridging flocculation of the polymeric latex particles by the excess of titanium dioxide particles, can be avoided. In addition, because paints prepared using composite particles tend to have higher effective volume solids than corresponding conventional paints, it is preferred that letdown ingredients of the paint, such as propylene glycol, excess water, and the like, be added to the aqueous dispersion of polymeric latex particles before adding the titanium dioxide grind or slurry, so that volume solids of the paint does not exceed a critical level during preparation.

Surprisingly, coatings containing the composite of the invention demonstrate superior performance not only over coatings containing composites based on polymer particles that are not formed from oligomers containing acid functionality but also over those composites based on polymer particles that are formed from oligomers containing acid functionality of higher molecular weight.

Preferably, the composites are used in paints to improve their performance properties. For example, the composites of the present invention are useful for improving the scrub resistance of a coating, the salt-spray resistance of a coating, and/or the efflorescence resistance of a coating.

The composites of the present invention and the aqueous compositions containing such composites are preferably used in or as architectural coatings such as interior and exterior house paints, including masonry paints, wood coatings and treatments, floor polishes, maintenance coatings such as metal coatings, and traffic paints such as those paints used to mark roads, pavements and runways. In a preferred embodiment, the present invention includes a method for coating a substrate, wherein the substrate is a wall, floor or ceiling of a building.

The composite of the present invention may also be useful for improving the hiding of a coating.

The invention will now be more specifically described in terms of the following examples of some preferred embodiments which are given for the purposes of illustration only, and may be contrasted with the comparative tests also given below.

EXAMPLES

Preparation of Oligomers
Preparation of Oligomer A

Oligomer A is a terminally unsaturated homooligomer of acrylic acid prepared according to the procedures described in U.S. Pat. No. 5,710,227. Oligomer A was prepared at 29% solids in water, with a weight average molecular weight, Mw, of 1199; and a number average molecular weight, Mn, of 485.

Preparation of Oligomer B

Oligomer B is a terminally unsaturated homooligomer of acrylic acid prepared according to the procedures described in U.S. Pat. No. 5,710,227. Oligomer B was prepared at 12.8% solids in water, with a weight average molecular weight, Mw, of 366; and a number average molecular weight, Mn, of 269.

Preparation of Polymer Particles
Preparation of Comparative Polymer Particles A

A mixture of monomers was prepared by combining 375 g of deionized water, 23.2 g of sodium dodecylbenzene sulfate, 1014.6 g of styrene, 293.7 g of butyl acrylate, and 26.7 g acrylic acid. The monomer mixture was emulsified by mixing under standard conditions. 1800 g of deionized water and 46.4 g of sodium dodecylbenzene sulfate were charged to a five liter flask, and the contents heated to 84–86° C. 30 g of the emulsified monomer mixture was charged to flask, followed by 29.7 g of an 15.8% aqueous solution of ammonium persulfate. The monomer mixture and 102 g of a 1.96% aqueous solution of ammonium persulfate were added separately to the flask over 120 minutes while maintaining the temperature of the contents at 84–85° C. The contents were then held at 84–85° C. for 15 minutes. After the additions were completed, the contents of the flask were cooled to 60° C. Any remaining monomer was reduced by the addition of aqueous ferrous sulfate, aqueous tertiary butyl hydroperoxide, and isoascorbic acid. The polymer was neutralized to a pH of 5.7 with ammonia. The product was diluted with deionized water to provide a polymer solids level of 35.1% by weight. The latex had a particle size of 73 nm and a viscosity of 11 cps.

Preparation of Polymer Particles B

A mixture of monomers was prepared by combining 325 g of deionized water, 30.3 g of sodium lauryl sulfate, 876 g of styrene, and 17.9 g acrylic acid. The monomer mixture was emulsified by mixing under standard conditions. 1800 g of deionized water and 42.6 g of sodium lauryl sulfate were charged to a five liter flask, and the contents heated to 84–86° C. 30 g of the emulsified monomer mixture was charged to flask, followed by 33 g of an 18.1% aqueous solution of ammonium persulfate. The monomer mixture and 62 g of a 2.9% aqueous solution of ammonium persulfate were added separately to the flask over 90 minutes while maintaining the temperature of the contents at 83–85° C. The contents were then held at 83–85° C. for 30 minutes. A second monomer emulsion was prepared as above consisting 217 g of deionized water, 20.2 g of sodium lauryl sulfate, 441 g of methyl methacrylate, 131 g of butyl acrylate, 11.9 g of acrylic acid, and 41.8 g of a 29% aqueous solution of Oligomer A. A second aqueous solution consisting of 51 g of an 2.4% of ammonium persulfate was prepare. The monomer emulsion and aqueous solution were fed over 60 minutes. After the additions were completed, the contents of the flask were cooled to 65° C. Any remaining monomer was reduced by the addition of aqueous ferrous sulfate, aqueous tertiary butyl hydroperoxide, and isoascorbic acid. The polymer was neutralized to a pH of 5.6 with ammonia. The product was diluted with deionized water to provide a polymer solids level of 36.2% by weight. The latex had a particle size of 62 nm and a viscosity of 10 cps.

Preparation of Polymer Particles C

A mixture of monomers was prepared by combining 217 g of deionized water, 20.2 g of sodium lauryl sulfate, 441 g of methyl methacrylate, 131 g of butyl acrylate, 11.9 g of acrylic acid, and 41.8 g of a 29% aqueous solution of Oligomer A. The monomer mixture was emulsified by mixing under standard conditions. 1800 g of deionized water and 13.3 g of sodium lauryl sulfate were charged to a five liter flask, and the contents heated to 84–86° C. 51 g of an 2.4% aqueous solution of ammonium persulfate was charged to flask. The monomer mixture and 62 g of a 2.9% aqueous solution of ammonium persulfate were added separately to the flask over 60 minutes while maintaining the temperature of the contents at 83–85° C. The contents were then held at 83–85° C. for 30 minutes. A second monomer emulsion was prepared as above consisting of 325 g of deionized water, 30.3 g of sodium lauryl sulfate, and 894 g of styrene. A second aqueous solution consisting of 61 g of an 2.9% of ammonium persulfate was prepare. The monomer emulsion and aqueous solution were fed over 90 minutes. After the additions were completed, the contents of the flask were cooled to 65° C. Any remaining monomer was reduced by the addition of aqueous ferrous sulfate, aqueous tertiary butyl hydroperoxide, and isoascorbic acid. The polymer was neutralized to a pH of 5.5 with ammonia. The product was diluted with deionized water to provide a polymer solids level of 36.0% by weight. The latex had a particle size of 78 nm and a viscosity of 10 cps.

Preparation of Polymer Particles D

A mixture of monomers was prepared by combining 500 g of deionized water, 50.6 g of sodium lauryl sulfate, 1125 g of methyl methacrylate, 328 g of butyl acrylate, 7.45 g of acrylic acid, and 298 g of a 10% aqueous solution of Oligomer B. The monomer mixture was emulsified by mixing under standard conditions. 1817 g of deionized water and 13.3 g of sodium lauryl sulfate were charged to a five liter flask, and the contents heated to 80–81° C. 33 g of an 18.2% aqueous solution of ammonium persulfate was charged to flask. The monomer mixture was added to the flask over 150 minutes while maintaining the temperature of the contents at 79–81° C. After the addition was completed, the contents of the flask were cooled to 60° C. Any remaining monomer was reduced by the addition of aqueous ferrous sulfate, aqueous tertiary butyl hydroperoxide, and isoascorbic acid. The polymer was neutralized to a pH of 5.5 with ammonia. The product was diluted with deionized water to provide a polymer solids level of 35.0% by weight. The latex had a particle size of 81 nm and a viscosity of 10 cps.

Preparation of Polymer Particles E

A mixture of monomers was prepared by combining 325 g of deionized water, 30.3 g of sodium lauryl sulfate, 876 g of styrene, and 17.9 g of acrylic acid. The monomer mixture was emulsified by mixing under standard conditions. 1800 g of deionized water and 42.6 g of sodium lauryl sulfate were charged to a five liter flask, and the contents heated to 84–86° C. 30 g of the monomer mix was added to the flask followed by 33 g of an 18.2% aqueous solution of ammonium persulfate. The monomer mixture and 62 g of a 2.9% aqueous solution of ammonium persulfate were added separately to the flask over 90 minutes while maintaining the temperature of the contents at 84–85° C. The reaction was held at this temperature for 30 minutes. A second mixture of monomers was prepared as above consisting of 217 g of deionized water, 20.2 g of sodium lauryl sulfate, 453 g of methyl methacrylate, 131 g of butyl acrylate, 11.9 g of acrylic acid, and 119.2 g of a 10% aqueous solution of Oligomer B. A second aqueous solution consisting of 51.2 g of an 2.3% of ammonium persulfate was prepare. The monomer emulsion and aqueous solution were fed over 60 minutes. After the additions were completed, the contents of the flask were cooled to 65° C. Any remaining monomer was reduced by the addition of aqueous ferrous sulfate, aqueous tertiary butyl hydroperoxide, and isoascorbic acid. The polymer was neutralized to a pH of 5.6 with ammonia. The product was diluted with deionized water to provide a polymer solids level of 36.0% by weight. The latex had a particle size of 67 nm and a viscosity of 10 cps.

Preparation of Comparative Polymer Particles F

A mixture of monomers was prepared by combining 542 g of deionized water, 9.8 g of sodium lauryl sulfate, 327.8 g of butyl acrylate, 1102.6 g of methyl methacrylate, and 59.6 g of acrylic acid. The monomer mixture was emulsified by mixing under standard conditions. 2041 g of deionized water and 10.64 g of sodium lauryl sulfate were charged to a five liter flask, and the contents heated to 80–81° C. 33 g of a 18.1% aqueous solution of ammonium persulfate was charged to the flask. The monomer mixture and was added to the flask over 150 minutes while maintaining the temperature of the contents at 80–81° C. After the additions were completed, the contents of the flask were cooled to 65° C. Any remaining monomer was reduced by the addition of aqueous ferrous sulfate, aqueous tertiary butyl hydroperoxide, and isoascorbic acid. The polymer was neutralized to a pH of 5.5 with ammonia. The product was diluted with deionized water to provide a polymer solids level of 35.4% by weight. The latex had a particle size of 74 nm and a viscosity of 10 cps.

Preparation of Polymer Particles G

A mixture of monomers was prepared by combining 542 g of deionized water, 9.8 g of sodium lauryl sulfate, 327.8 g of butyl acrylate, 1102.6 g of methyl methacrylate, 29.8 g of acrylic acid, and 104.5 g of a 29% aqueous solution of Oligomer A. The monomer mixture was emulsified by mixing under standard conditions. 1947 g of deionized water and 13.3 g of sodium lauryl sulfate were charged to a five liter flask, and the contents heated to 80–81° C. 33 g of a 18.1% aqueous solution of ammonium persulfate was charged to the flask. The monomer mixture was added to the flask over 150 minutes while maintaining the temperature of the contents at 80–81° C. After the additions were completed, the contents of the flask were cooled to 65° C. Any remaining monomer was reduced by the addition of aqueous ferrous sulfate, aqueous tertiary butyl hydroperoxide, and isoascorbic acid. The polymer was neutralized to a pH of 5.4 with ammonia. The product was diluted with deionized water to provide a polymer solids level of 35.9% by weight. The latex had a particle size of 81 nm and a viscosity of 10 cps.

Preparation of Semi-gloss Paint Compositions

For comparison purposes, semi-gloss paint coating compositions were prepared according to the following formulations.

Notes

TAMOL 731 dispersant is a hydrophobic dispersant, available from Rohm and Haas Company (Philadelphia, Pa.).

TI-PURE R-706 is a coatings grade rutile titanium dioxide, available from E. I. DuPont de Nemours and Company (Wilmington, Del.).

BYK-022 is a defoamer available from Byk Chemie (Germany).

RHOPLEX SG-10M polymer is an emulsion polymer, 45% solids, 150 nm, available from Rohm and Haas Company (Philadelphia, Pa.).

TEXANOL solvent is available from Eastman Kodak Company (Rochester, N.Y.).

DREWPLUS L-475 defoamer is available from Ashland Chemical Company (Columbus, Ohio).

ACRYSOL 2020 NPR and ACRYSOL RM-8W are thickeners available from Rohm and Haas Company (Philadelphia, Pa.).

Comparative Paint Example 1

Comparative Paint Example 1 was prepared as follows:

| Component | Weight (g) |
| --- | --- |
| Water | 38.40 |
| TAMOL731 dispersant | 1.45 |
| BYK-022 defoamer | 0.50 |
| TI-PURE R-706 titanium dioxide | 121.13 |

These components were milled on a high speed disk disperser to form a pigment grind. The grind was letdown at a slower speed with the following materials:

| Component | Weight (g) |
| --- | --- |
| RHOPLEX SG-10M binder | 243.09 |
| Propylene glycol | 39.79 |
| TEXANOL solvent | 13.80 |

-continued

| Component | Weight (g) |
|---|---|
| DREWPLUS L-475 defoamer | 0.57 |
| ACRYSOL RM-2020 NPR thickener | 11.37 |
| ACRYSOL RM-8W thickener | 0.50 |
| Water | 42.75 |

Paint Example 2

Paint Example 2 was prepared by the same method modifying the above formulation grind of Comparative Paint Example 1 with 69.20 g of Polymer Particles A and 8.1 g of water. This grind was letdown with the components:

| Component | Weight (g) |
|---|---|
| RHOPLEX SG-10M binder | 194.65 |
| Propylene glycol | 35.06 |
| TEXANOL solvent | 12.16 |
| DREWPLUS L-475 defoamer | 0.50 |
| ACRYSOL RM-2020 NPR thickener | 10.00 |
| ACRYSOL RM-8W thickener | 0.70 |
| Water | 35.05 |

Paint Example 3

Paint Example 3 was prepared by the same method modifying the above formulation grind of Comparative Paint Example 1 with 66.90 g of Polymer Particles B and 8.1 g of water. This grind was letdown with the components:

| Component | Weight (g) |
|---|---|
| RHOPLEX SG-10M binder | 194.44 |
| Propylene glycol | 35.06 |
| TEXANOL solvent | 12.16 |
| DREWPLUS L-475 defoamer | 0.50 |
| ACRYSOL RM-2020 NPR thickener | 10.00 |
| ACRYSOL RM-8W thickener | 0 |
| Water | 35.05 |

Paint Example 4

Paint Example 4 was prepared by the same method modifying the above formulation grind of Comparative Paint Example 1 with 67.23 g of Polymer Particles C and 8.1 g of water. This grind was letdown with the components:

| Component | Weight (g) |
|---|---|
| RHOPLEX SG-10M binder | 194.44 |
| Propylene glycol | 35.06 |
| TEXANOL solvent | 12.16 |
| DREWPLUS L-475 defoamer | 0.50 |
| ACRYSOL RM-2020 NPR thickener | 10.00 |
| ACRYSOL RM-8W thickener | 0 |
| Water | 35.05 |

Paint Example 5

Paint Example 5 was prepared by the same method modifying the above formulation grind of Comparative Paint Example 1 with 69.2 g of Polymer Particles D and 8.1 g of water. This grind was letdown with the components:

| Component | Weight (g) |
|---|---|
| RHOPLEX SG-10M binder | 194.61 |
| Propylene glycol | 35.06 |
| TEXANOL solvent | 12.16 |
| DREWPLUS L-475 defoamer | 0.50 |
| ACRYSOL RM-2020 NPR thickener | 10.00 |
| ACRYSOL RM-8W thickener | 0.3 |
| Water | 40.83 |

Paint Example 6

Paint Example 6 was prepared by the same method modifying the above formulation grind of Comparative Paint Example 1 with 67.91 g of Polymer Particles E and 8.1 g of water. This grind was letdown with the components:

| Component | Weight (g) |
|---|---|
| RHOPLEX SG-10M binder | 194.61 |
| Propylene glycol | 35.06 |
| TEXANOL solvent | 12.16 |
| DREWPLUS L-475 defoamer | 0.50 |
| ACRYSOL RM-2020 NPR thickener | 10.00 |
| ACRYSOL RM-8W thickener | 00.3 |
| Water | 42.43 |

Scattering Coefficient. Kubelka-Munk scattering coefficients were determined for all paints by a modified version of ASTM D 2805-70. On dean glass plates, 10"×12"×0.25" (254 mm×304.8 mm×6.35 mm), four drawdowns were made for each sample. Triplicate drawdowns with 1.5 mil (0.0254 mm) Bird applicator and a single 40 mil (1.016 mm) draw down were made. The draw downs were allowed to dry for 7 days in a controlled temperature room (25° C./50% relative humidity). The dried films were scored with a 2.5"×6" (64.5 mm×152 mm) template using an excel knife. Five reflectance values were measured in the scored areas with a portable Gardner Reflectometer. The scored area was removed from the plate, placed in a tared weighing pan, and dried at 120° C. overnight. The weight of this dried film was obtained. The scattering coefficient was calculated from the Kubelka-Munk equation. The higher the coefficient the greater the opacity of the film. The results are shown in the following table:

| Paint Example | Polymer Particles | Scattering Coefficient |
|---|---|---|
| 1 Control | none | 7.30 |
| 2 Comparative | A (Comparative) 2% acrylic acid | 7.42 |
| 3 | B 0.8% oligomeric acrylic acid (Mw = 1200) 2% acrylic acid | 9.28 |
| 4 | C 0.8% oligomeric acrylic acid (Mw = 1200) 0.8% acrylic acid | 9.26 |

-continued

| Paint Example | Polymer Particles | Scattering Coefficient |
|---|---|---|
| 5 | D<br>2% oligomeric acrylic acid<br>(Mw = 366)<br>0.5% acrylic acid | 8.29 |
| 6 | E<br>0.8% oligomeric acrylic acid<br>(Mw = 366)<br>2% acrylic acid | 8.39 |

The results show a dramatic increase in the scattering coefficient of paints with the polymer-pigment composite of the invention (Paint Examples 2–6). The Paint Example 1 (Control—no polymer-pigment composite) and Paint Example 2 (Comparative—polymer-pigment composite not of invention) showed similar scattering coefficients. The greater scattering coefficient of the paints containing the polymer-pigment composites of the invention demonstrates a greater hiding in dry films. Differences in scattering coefficient of 0.25 are considered significant.

Preparation of Flat Paints Compositions

For comparison purposes, flat coating compositions were prepared according to the following formulations.

Notes

TAMOL 731 dispersant is a hydrophobic dispersant, available from Rohm and Haas Company (Philadelphia, Pa.).

TRITON CF-10 surfactant is available from Union Carbide Corporation (Danbury, Conn.).

TI-PURE R-706 is a coatings grade rutile titanium dioxide, available from E. I. DuPont de Nemours and Company (Wilmington, Del.).

BYK-022 is a defoamer available from Byk Chemie (Germany).

RHOPLEX MULTILOBE 200 binder is an emulsion polymer, available from Rohm and Haas Company (Philadelphia, Pa.).

TEXANOL solvent is available from Eastman Kodak Company (Rochester, N.Y.).

DREWPLUS L-475 defoamer is available from Ashland Chemical Company (Columbus, Ohio).

NATROSOL 250 MHR thickener is available from Aqualon Company.

MINEX 4 silicate extender is available from Unimin Specialty Minerals Company (Elco, Ill.).

ICECAP K clay extender is available from Burgess Pigment Company (Sandersville, Ga.).

EAGLE 417W zinc oxide extender is available from Eagle Zinc Company (New York, N.Y.).

Comparative Paint Example 7

Comparative Paint 7 was prepared by milling the following components on a high speed disk disperser to form a pigment grind.

| Component | Weight (g) |
|---|---|
| Water | 1919.16 |
| TAMOL 731A dispersant | 72.60 |
| BYK-022 defoamer | 25.0 |
| TI-PURE R-706 titanium dioxide | 6050 |

The composite was prepared by adding 806.7 g of the above pigment grind to 341.82 g of Polymer Particles F and 3.92 g of water. Prior to adding the composite to the final paint composition, the following components were mixed on a high speed disk disperser to prepare an extender grind.

| Component | Weight (g) |
|---|---|
| Water | 309.35 |
| TAMOL 731A dispersant | 31.17 |
| Propylene glycol | 77.92 |
| TRITON CF-10 surfactant | 3.90 |
| DREWPLUS L-475 defoamer | 3.90 |
| MINEX 4 extender | 211.36 |
| ICECAP K extender | 70.30 |
| EAGLE 417W extender | 349.62 |

A common letdown base was prepared by adding and mixing the following materials.

| Component | Weight (g) |
|---|---|
| Extender grind | 643.51 |
| RHOPLEX MULTILOBE 200 binder | 1011.2 |
| Propylene glycol | 28.17 |
| TEXANOL solvent | 32.49 |
| DREWPLUS L-475 defoamer | 3.00 |
| NATROSOL 250 MHR thickener | 13.49 |
| Aqueous ammonia | 5.99 |
| Water | 179.81 |

254.47 g of the extended letdown was then added to 184.19 g of titanium dioxide-polymer particle composite and 16 g of water to provide a paint with 46.0% pigment volume concentration and 35.8% volume solids.

Paint Example 8

Paint Example 8 was prepared as described in Comparative Paint Example 7 with certain modifications. The polymer-pigment composite was prepared by adding 806.7 g of the pigment grind to 337.08 g of Polymer Particles G and 8.66 g of water. 254.47 g of the extended letdown was then added to 184.19 g of polymer-pigment composite and 16 g of water to provide a paint with 46.0% pigment volume concentration and 35.8% volume solids.

Scattering Coefficient. Kubelka-Munk scattering coefficients were determined for the paints by a modified version of ASTM D 2805-70. On clean glass plates, 10"×12"×0.25" (254 mm×304.8 mm×6.35 mm), four drawdowns were made for each sample. Triplicate drawdowns with 1.5 mil (0.0254 mm) Bird applicator and a single 40 mil (1.016 mm) draw down were made. The draw downs were allowed to dry for 7 days in a controlled temperature room (25° C./50% relative humidity). The dried films were scored with a 2.5"×6" (64.5 mm×152 mm) template using an excel knife. Five reflectance values were measured in the scored areas with a portable Gardner Reflectometer. The scored area was removed from the plate, placed in a tared weighing pan, and dried at 120° C. overnight. The weight of this dried film was obtained. The scattering coefficient was calculated from the Kubelka-Munk equation. The higher the coefficient the greater the opacity of the film. The results are shown in the following table:

| Paint Example | Polymer Particles | Scattering Coefficient |
| --- | --- | --- |
| 7 Comparative | F (Comparative) 4% acrylic acid | 6.08 |
| 8 | G 2% oligomeric acrylic acid, Mw = 1200 2% acrylic acid | 6.72 |

The results show a significant increase in the scattering coefficient of paints with the polymer-pigment composite of the invention (Paint Example 8) relative to the comparative paint that does not contain the polymer-pigment composite of the invention but having the same overall level of acrylic acid (Comparative Paint 7). The greater scattering coefficient of the paints with the polymer-pigment composites of the invention demonstrates a greater hiding in the dry films.

We claim:

1. A composite, comprising:
   a. pigment particles; and
   b. discrete polymer particles adsorbed onto the surface of said pigment particles;
      wherein the polymer particles are formed from 0.05% by weight to 20% by weight, based on the weight of the polymer particles, of at least one terminally unsaturated oligomer of the formula:

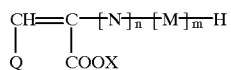

wherein N is the residue of an ethylenically unsaturated monomer of the formula:

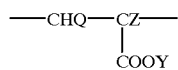

wherein M is the residue of an ethylenically unsaturated acrylic or vinyl monomer other than N;
   wherein said N and M residues are randomly arranged in said oligomer;
   wherein m is the total number of M residues in said oligomer and is in the range 0 to 35;
   wherein n is the total number of N residues in said oligomer and is in the range 1 to 70;
   wherein the sum of n and m is in the range from 1 to 70;
   wherein X and each Y is independently selected from the group consisting of H, NH$_4$, alkali metals and alkaline earth metals;
   wherein each Q is independently selected from the group consisting of H and COOX; and
   wherein each Z is independently selected from the group consisting of H and CH$_3$.

2. The composite of claim 1, wherein the pigment particles are titanium dioxide.

3. The composite of claim 1, wherein the weight-average molecular weight of said polymer particles is at least 100,000.

4. The composite of claim 1, wherein the glass transition temperature of said polymer particles, as measured by differential scanning calorimeter at a rate of 20° C./minute, is from −25° C. to 120° C.

5. The composite of claim 1, wherein average particle size of said polymer particles is less than 250 nm.

6. The composite of claim 1, wherein average particle size of said polymer particles is less than 80 nm.

7. A coating composition, comprising said composite of any one of claims 1–6.

8. A process for preparing an aqueous dispersion of polymer-pigment composite particles, comprising the steps of:
   (1) dispersing pigment particles in a first aqueous medium;
   (2) preparing a dispersion or suspension of polymer particles in a second aqueous medium, said polymer particles are formed from 0.05% by weight to 20% by weight, based on the weight of the polymer particles, of at least one terminally unsaturated oligomer of the formula:

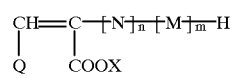

wherein N is the residue of an ethylenically unsaturated monomer of the formula:

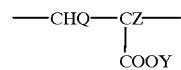

wherein M is the residue of an ethylenically unsaturated acrylic or vinyl monomer other than N;
   wherein said N and M residues are randomly arranged in said oligomer;
   wherein m is the total number of M residues in said oligomer and is in the range 0 to 35;
   wherein n is the total number of N residues in said oligomer and is in the range 1 to 70;
   wherein the sum of n and m is in the range from 1 to 70;
   wherein X and each Y is independently selected from the group consisting of H, NH$_4$, alkali metals and alkaline earth metals;
   wherein each Q is independently selected from the group consisting of H and COOX; and
   wherein each Z is independently selected from the group consisting of H and CH$_3$;
   (3) mixing said first aqueous medium and said second aqueous medium; and
   (4) permitting said polymer particles to adsorb onto said pigment particles to form composite particles.

9. A process for preparing an aqueous dispersion of polymer-pigment composite particles, comprising the steps of:
   (1) preparing a dispersion or suspension of polymer particles in an aqueous medium, said polymer particles formed from 0.05% by weight to 20% by weight, based on the weight of the polymer particles, of at least one terminally unsaturated oligomer of the formula:

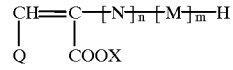

wherein N is the residue of an ethylenically unsaturated monomer of the formula:

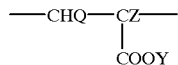

wherein M is the residue of an ethylenically unsaturated acrylic or vinyl monomer other than N;

wherein said N and M residues are randomly arranged in said oligomer;

wherein m is the total number of M residues in said oligomer and is in the range 0 to 35;

wherein n is the total number of N residues in said oligomer and is in the range 1 to 70;

wherein the sum of n and m is in the range from 1 to 70;

wherein X and each Y is independently selected from the group consisting of H, $NH_4$, alkali metals and alkaline earth metals;

wherein each Q is independently selected from the group consisting of H and COOX; and wherein each Z is independently selected from the group consisting of H and $CH_3$;

(2) dispersing pigment particles in said aqueous medium; and (3) permitting said polymer particles to adsorb onto said pigment particles to form composite particles.

10. A method of improving the opacity of a coating composition, comprising the steps of:

(1) dispersing pigment particles in a first aqueous medium;

(2) preparing a dispersion or suspension of polymer particles in a second aqueous medium, said polymer particles formed from 0.05% by weight to 20% by weight, based on the weight of the polymer particles, of at least one terminally unsaturated oligomer of the formula:

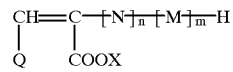

wherein N is the residue of an ethylenically unsaturated monomer of the formula:

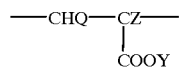

wherein M is the residue of an ethylenically unsaturated acrylic or vinyl monomer other than N;

wherein said N and M residues are randomly arranged in said oligomer;

wherein m is the total number of M residues in said oligomer and is in the range 0 to 35;

wherein n is the total number of N residues in said oligomer and is in the range 1 to 70;

wherein the sum of n and m is in the range from 1 to 70;

wherein X and each Y is independently selected from the group consisting of H, $NH_4$, alkali metals and alkaline earth metals;

wherein each Q is independently selected from the group consisting of H and COOX; and wherein each Z is independently selected from the group consisting of H and $CH_3$;

(3) mixing said first aqueous medium and said second aqueous medium;

(4) permitting said polymer particles to adsorb onto said pigment particles to form composite particles;

(5) adding said composite particles to a coating formulation; and (6) applying said coating formulation to a substrate.

* * * * *